United States Patent [19]

Haddad, Jr.

[11] Patent Number: 5,238,287
[45] Date of Patent: Aug. 24, 1993

[54] FRONT MOUNT TELESCOPIC ARM TRUCK COVER SYSTEM

[75] Inventor: Edward N. Haddad, Jr., Worcester, Mass.

[73] Assignee: Pioneer Consolidated Corporation, North Oxford, Mass.

[21] Appl. No.: 931,030

[22] Filed: Aug. 14, 1992

[51] Int. Cl.$^5$ .............................................. B60P 7/04
[52] U.S. Cl. ........................................ 296/98; 296/100; 160/71
[58] Field of Search .......................... 296/98, 100, 101; 160/68, 69, 72, 71

[56] References Cited

U.S. PATENT DOCUMENTS

| | | | |
|---|---|---|---|
| 3,041,104 | 6/1962 | Richard | 296/100 |
| 3,366,414 | 1/1968 | Thompson et al. | 296/100 |
| 3,549,199 | 12/1970 | Sibley | 296/100 |
| 3,628,826 | 12/1971 | Sibley | 296/98 |
| 3,656,802 | 4/1972 | White | 296/100 |
| 3,868,142 | 2/1975 | Bachand et al. | 296/98 |
| 3,964,781 | 6/1976 | Fenton | 296/100 |
| 3,975,047 | 8/1976 | McClellan | 296/100 |
| 4,023,857 | 5/1977 | Killion | 296/98 |
| 4,030,780 | 6/1977 | Petretti | 296/100 |
| 4,050,734 | 9/1977 | Richard | 296/98 |
| 4,095,840 | 6/1978 | Woodard | 296/100 |
| 4,157,202 | 6/1979 | Bachand | 296/100 |
| 4,189,178 | 2/1980 | Cramaro | 296/105 |
| 4,341,416 | 7/1982 | Richard | 296/98 |
| 4,516,802 | 5/1985 | Compton | 296/98 |
| 4,518,194 | 5/1985 | Kirkham et al. | 296/100 |
| 4,842,323 | 6/1989 | Trickett | 296/98 |
| 4,874,196 | 10/1989 | Goldstein et al. | 296/98 |
| 4,981,317 | 1/1991 | Acosta | 296/98 |

OTHER PUBLICATIONS

The Hydra Cover Pioneer Cover-All, brochure, Model HR4500 Series.
Tarper brochure.

Primary Examiner—Dennis H. Pedder
Attorney, Agent, or Firm—Weingarten, Schurgin, Gagnebin & Hayes

[57] ABSTRACT

A truck cover assembly is provided having an improved telescopic arm assembly for drawing a flexible cover across an upwardly open truck body or container. The front mounted assembly is secured to a portion of the truck frame between the cab and the body, and comprises a pair of pivoting telescopic arms, a drive motor, a flexible truck cover, a tie-rod, and a cover housing. As the drive motor moves the arms fore or aft, arm mounted actuators cause the segmented arms to extend or retract so that the tie-rod connecting the upper arm ends and securing one end of the cover, travels horizontally over the upper edge of the body in close proximity to it. Extension or retraction of the telescopic arms occurs simultaneously and proportionately with the rearward or forward pivoting of the arms. The cover housing, optionally mounted on a retractable gantry, protects the cover and incorporates a spring tension device to assist in smoothly rolling and unrolling the flexible cover.

21 Claims, 3 Drawing Sheets

FRONT MOUNT TELESCOPIC ARM TRUCK COVER SYSTEM

FIELD OF THE INVENTION

The invention relates to truck covers and more particularly to an assembly used to manipulate a truck cover.

BACKGROUND OF THE INVENTION

Pliable covers for truck bodies, containers, or trailers serve both to protect a load within the body and to minimize the likelihood of all or part of the load from escaping from the body. Because covers for truck bodies are often large and unwieldy, some form of mechanical assistance is useful to spread and secure the cover over the truck body. Truck cover manipulators provide this assistance.

A truck cover manipulator assembly, such as shown in U.S. Pat. No. 4,050,734 to Richard, uses two metal arms powered by a drive mechanism to draw the flexible cover over the body from one end to the other. As the arms move longitudinally, the arm ends securing one end of the cover move in an arcuate path. When the arms are vertical, they raise the effective height of the truck considerably. Even when an operator is aware that the arms will extend upward, their exact height and amount of obstacle clearance are difficult to estimate visually. This situation is particularly hazardous when a truck cover manipulator assembly is operated near overhead power lines, because the arms of the truck cover manipulator assembly have the potential to contact the power lines and electrocute the operator or damage the truck.

In addition to the risk of electrocution, as the arms swing up and over the body, the upper portion of the arms are susceptible to bending from the load upon them or from striking an object. Furthermore, as the truck cover rises up with the arms, the truck cover may be caught by the wind, thereby inhibiting proper operation of the system or causing damage to it. In certain confined areas, such as in tunnels or under bridges, it is not possible to operate this type of manipulator assembly at all.

One solution for problems associated with truck cover support arms raising high above the body is taught in U.S. Pat. No. 4,874,196 to Goldstein et al. Goldstein teaches attachment of pivoting telescopic arms and actuators near the midpoint of a container for drawing a cover across the container in a low trajectory. Other truck cover manipulators such as U.S. Pat. Nos. 3,964,781 to Fenton; 4,023,857 to Killion; and 3,041,104 to Richard teach substantially horizontal deployment and retraction of a cover over an open body using tracks, guide-rails, or cables integrated with the body to help guide and anchor the cover.

Because the prior art truck cover assemblies are permanently attached to their bodies, their use is not economical in a trucking operation which uses roll-off container bodies, nor do they offer the possibility of an easily installed and detached manipulator comprising a single self-contained assembly. Furthermore, arms mounted at the midpoint of a body, whether projecting outward from the body or not, are not well protected from being struck and are therefore easily damaged.

SUMMARY OF THE INVENTION

A self-contained, easily installed and removed, front mounted truck cover assembly uses telescopic arms for drawing a flexible cover horizontally across an upwardly open truck body or container at substantially the same height as the upper edge of the body. The entire assembly is mounted on a portion of the truck frame between the cab and body, and permits unobstructed access to the interior of the body. Because the assembly is independent from the body, it is especially usefully for roll-off container bodies. In one embodiment, the assembly comprises a flexible cover, a cover housing, a support structure, a pair of pivoting telescopic arms, and a drive motor. As the drive motor moves the arms fore or aft, a separate drive mechanism causes the arms to simultaneously extend or retract so that the upper arm ends securing one end of the cover travels parallel and in close proximity to the upper edge of the body. The cover housing protects the cover and incorporates a winding device to assist in smoothly rolling and unrolling the flexible cover.

In another embodiment, the assembly further comprises a cover housing mounted on a retractable gantry. When the gantry is fully retracted, the cover housing is below the upper edge of the body. The gantry is raised to an appropriate height for extraction and rewinding of the cover. The telescopic arms are fully retractable below the upper edge of the body, and may be connected by a tie-rod.

DESCRIPTION OF DRAWINGS

The invention will be more fully understood from the following detailed description, taken in conjunction with the accompanying drawings in which.

DETAILED DESCRIPTION OF THE INVENTION

Figure 1:
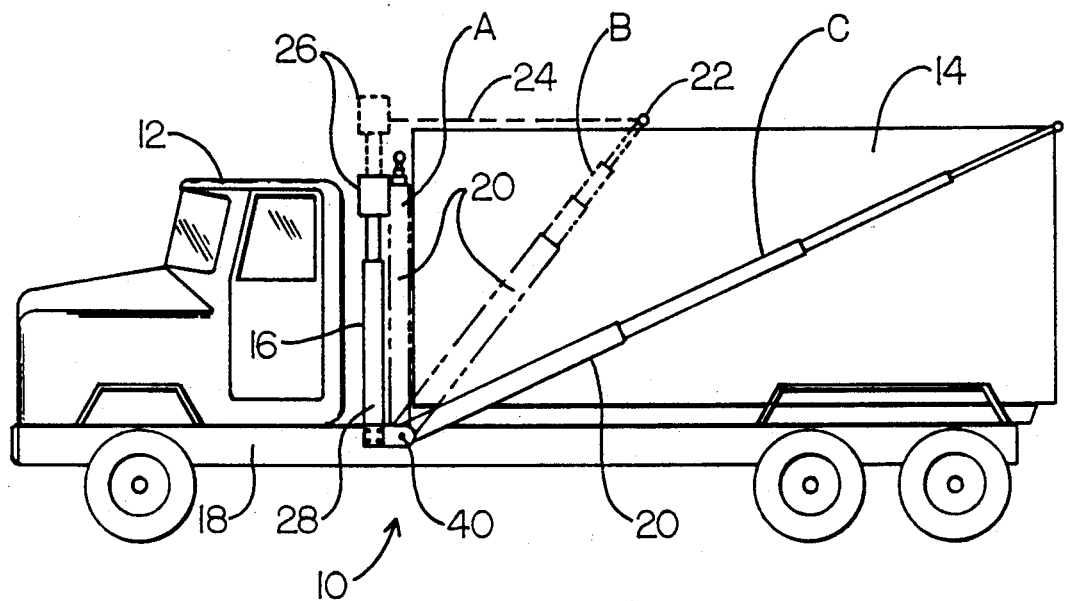
FIG. 1 is a side view of a front mount telescopic arm assembly installed on a container truck with a roll-off container body.

FIG. 1 depicts a left side view of a container truck 10, having a cab 12 and an upwardly open roll-off container 14, with an embodiment of a front mount telescopic arm assembly 16 installed thereon. The assembly 16 is a single unit with several components and is located behind the cab 12 and mounted to a portion of the frame 18 of the truck 10 in front of, and independent from, the container 14. Thus, when the body 14 is rolled off of, or separated from the frame 18 of the truck 10, the assembly 16 remains behind and is available for use with a subsequently installed container 14.

Another benefit of positioning the assembly 16 between the cab 12 and container 14 is a reduced exposure to damaging impacts or scrapes. The assembly 16 is dimensioned so that it protrudes minimally from the sides of the of the truck 10 if at all. Additionally, the nature and location of the assembly 16 permit unobstructed loading and unloading of a container 14 as well as unobstructed access to the interior of the container. Furthermore, incorporation of all components of the assembly 16 into a single unit, allows for it to be rapidly and easily installed and removed as needed.

The assembly 16 shown in FIG. 1 has two substantially identical telescopic arms 20 pivotally attached at their base to the assembly 16, one telescopic arm 20 on the right side of the truck 10 and the other telescopic arm 20 on the left side. A tie-rod 22 connects the upper ends of the telescopic arms 20 to each other and anchors one end of a flexible truck cover 24. By connecting the upper ends of the telescopic arms 20, the tie-rod 22 stabilizes the telescopic arms 20 during movement of the truck 10 and it helps to ensure that the telescopic arms 20 move in unison when activated. The tie-rod 22 is typically a bar or tube with curved exterior surfaces that glide smoothly over the upper surfaces of the container 14 if they are in contact. A cover housing 26 anchors the other end of the truck cover 24 and is mounted on a telescopic gantry 28. The cover housing 26 provides a means for easily furling and unfurling the truck cover 24 when the assembly 16 is activated and shields the truck cover 24 from wind blast when the truck 10 is driven at highway speeds.

When the assembly is activated, the telescopic arms 20 simultaneously pivot while telescoping. FIG. 1 depicts the telescopic arms 20 in three different positions corresponding to various stages of activation of the assembly 16. A first, or fully retracted stage (A), is when each of the telescopic arms 20 are completely compressed and in an upright position in front of the container 14, the telescopic gantry 28 is lowered, and the truck cover 24 is stowed in the cover housing 26. In this retracted stage, the interior of the upwardly open container 14 is completely unobstructed by any element of the assembly 16 which might either interfere with or be damaged by loading or unloading operations.

An intermediate stage (B) is obtained when the fully retracted assembly 16 is activated in order to cover the container 14, or when the fully extended assembly 16 is retracted to uncover the container 14. In either instance, the telescopic gantry 28 is raised a sufficient amount to permit smooth and unobstructed unfurling of the truck cover 24, and each of the telescopic arms 20 are raised enough to allow the tie-rod 22 to pass over the container 14. Simultaneous extension of the telescopic arms 20 places the truck cover 24 under tension, thereby causing the truck cover 24 to be unfurled from the cover housing 26 and pulled over the container 14. In like manner, simultaneous contraction of the telescopic arms 20 reduces tension on the truck cover 24, thereby allowing a rewinding mechanism as known in the art to retract and stow the truck cover 24 within the cover housing 26.

A fully extended position (C) is obtained when the telescopic arms 20 are elongated to a length sufficient to reach a desired end point on the container 14. The truck cover 24 is spread over substantially all of the upwardly open portion of the container 14 and held securely in place over the load by tension created by the mechanism in the cover housing 26 as well as by the telescopic arms 20. The telescopic arms 20 are held in position by mechanical, electrical, pneumatic or hydraulic force.

Figure 2:
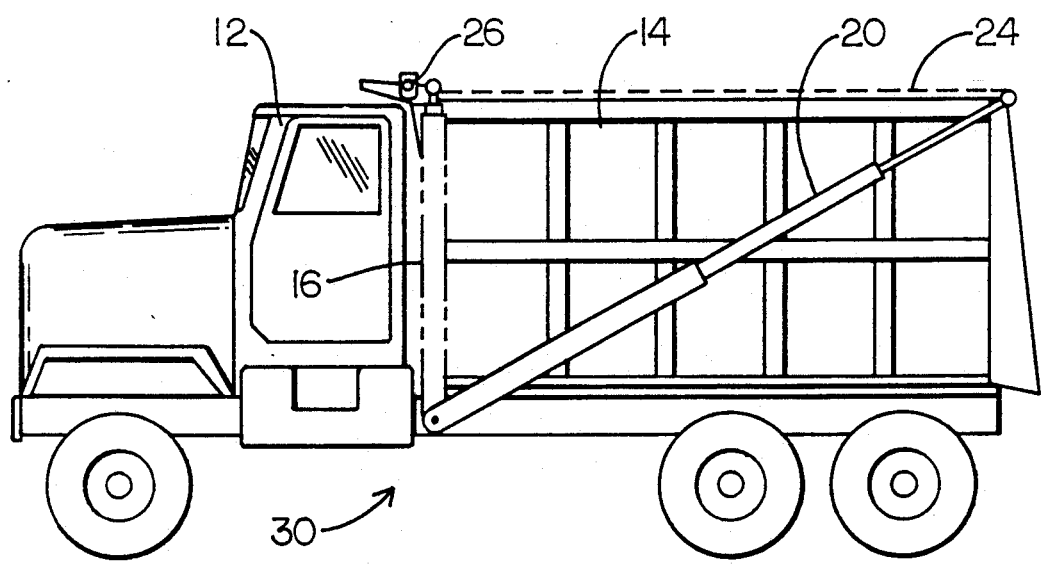
FIG. 2 is a side view of a front mount telescopic arm assembly installed on a truck with a dump body.

Referring to FIG. 2, a different embodiment of the front mount telescopic arm assembly 16 is shown for use with a dump-body truck 30. In this embodiment the telescopic arms 20 are as described with respect to FIG. 1, however, the cover housing 26 is affixed to a portion of the container 14 in lieu of the telescopic gantry 28 of FIG. 1. Operation of the assembly 16 is substantially similar to that described with respect to FIG. 1.

Figure 3:
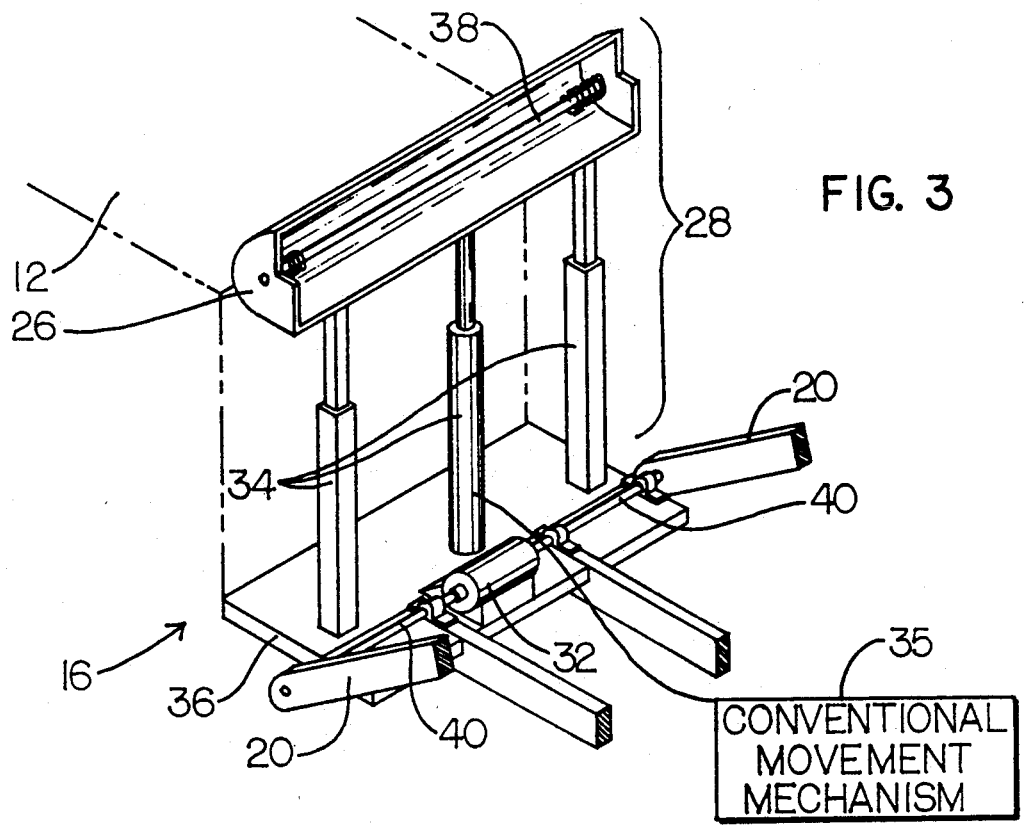
FIG. 3 is a perspective view of the front mount telescopic arm assembly of FIG. 1.

FIG. 3 is a perspective view of one embodiment of the assembly 16 of FIG. 1, showing additional features of the telescopic gantry 28 and a drive mechanism 32 for moving the telescopic arms 20 fore and aft. The telescopic gantry 28 consists of at least one telescopic support pillar 34 secured to a support platform 36. The support platform 36 is used to support the components of the assembly 16 and provides a single point of connection for securing the entire assembly 16 to the frame 18 of the truck 10 to facilitate installation and removal of the assembly. The assembly 16 is also suitable for being permanently affixed to the frame 18 of the truck 10, and additional support elements may be used to further strengthen its attachment thereto.

In FIG. 3, the cover housing 26 is supported by three telescopic support pillars 34 with the central pillar 34 incorporating a device or movement mechanism 35 for providing a controlled force to raise, lower, and lock the cover housing 26 in various positions. However, any or all of the three pillars 34 may incorporate devices for providing the controlled force. The controlled force provided by the central pillar 34 may be derived from an integral hydraulic or pneumatic piston, a linear actuator, a mechanical screw, or an electric motor. The cover housing 26, shown without the truck cover 24, is a protective shell with a spring-loaded roller 38 passing therethrough for supporting and winding the truck cover 24.

Figure 4:
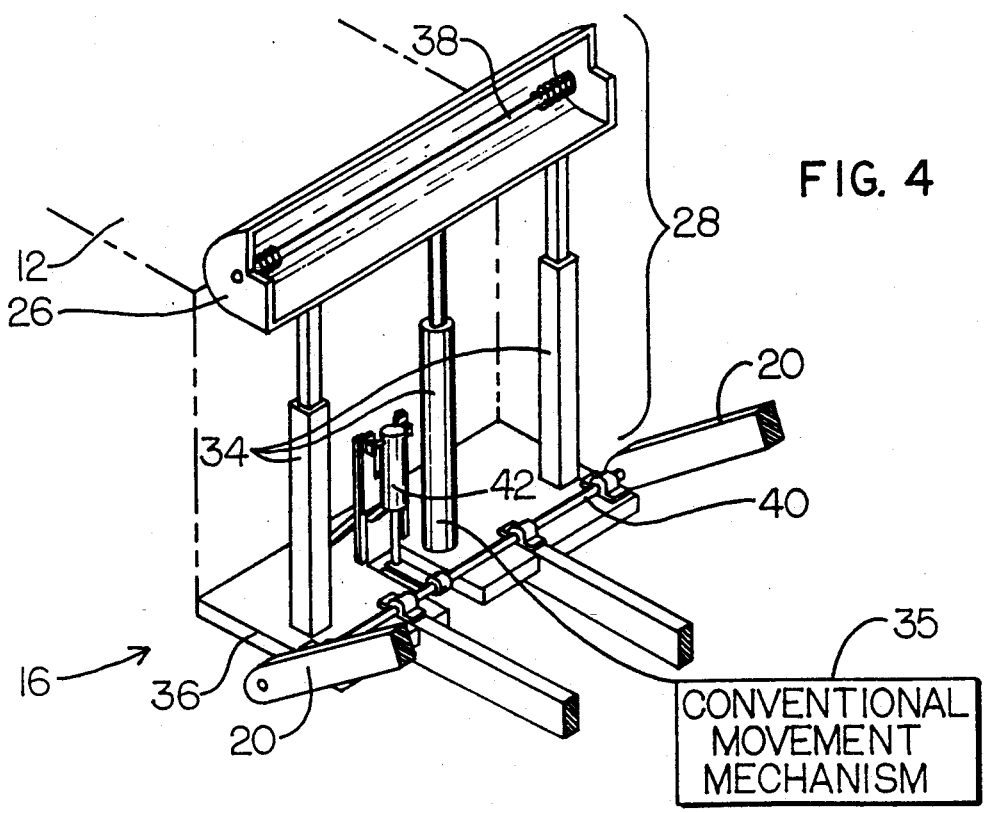
FIG. 4 is a perspective view of an alternative embodiment of the front mount telescopic arm assembly of FIG. 3.

The telescopic arms 20 move in two different senses: fore and aft; and extension and retraction. In order to permit fore and aft movement of the telescopic arms 20 along the sides of the body 14, each of the arms 20 is pivotally attached to the assembly support platform 36. Fore and aft actuation of the arms 20 may be via: hydraulic or pneumatic cylinders coupled directly to the arms 20 or acting through a linkage such as a bellcrank; hydraulic or electric motors; or cables and pulleys. In the embodiment of FIG. 3, pivotal articulation of the lower end of each arm 20 is furnished by a shaft 40 connected to the drive mechanism 32 which is anchored to the assembly support platform 36. When the drive mechanism 32 is activated, it turns the shaft 40 which causes the arms 20 to rotate with the shaft in unison. FIG. 4 is a depiction of an alternative embodiment of the assembly 16 of FIG. 3 which uses a linear actuator 42 as the drive mechanism 32. Movement of the arms 20 fore and aft requires that the arms 20 extend and retract in order to maintain a substantially stable height near the top of the container 14 while the truck cover 24 is being unfurled or stowed. As with the drive mechanism 32 which moves the arms 20 back and forth, there are many ways to cause the arms 20 to extend and retract, including: hydraulic and pneumatic cylinders; linear, hydraulic, or pneumatic linear actuators; lead screw(s); and cables and pulleys.

Figure 6:
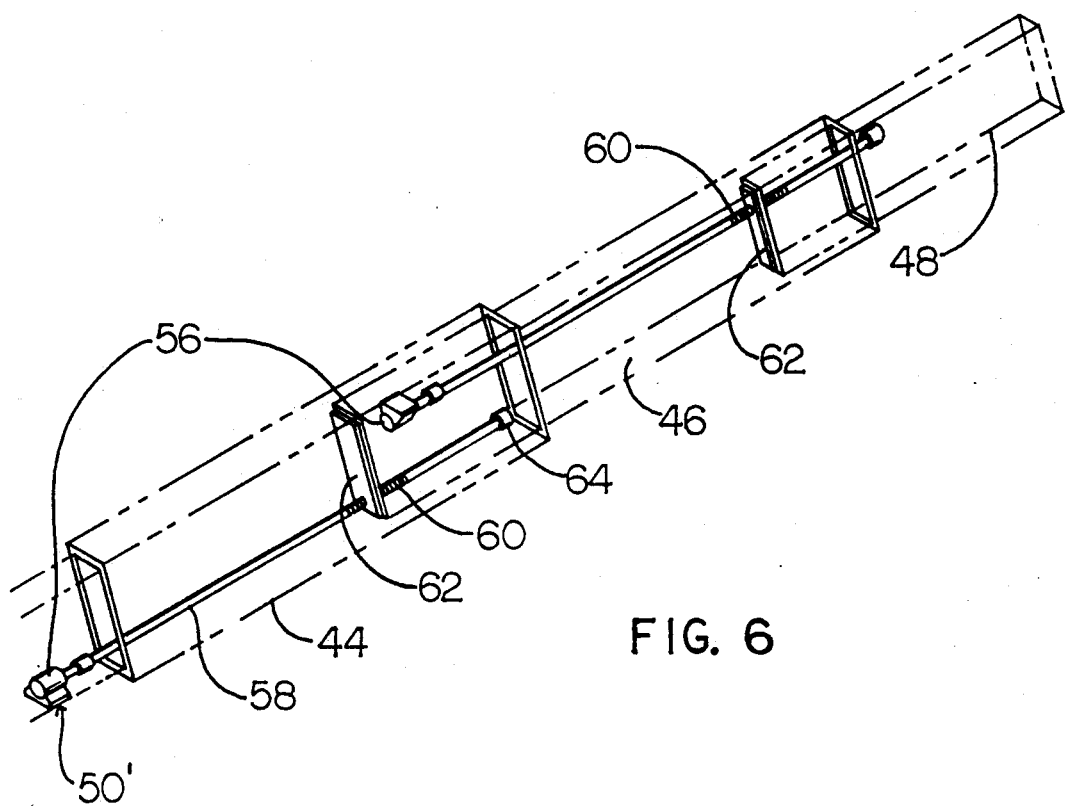
FIG. 6 is a perspective view of an alternative embodiment of the telescopic arm of FIG. 5.
Figure 5:
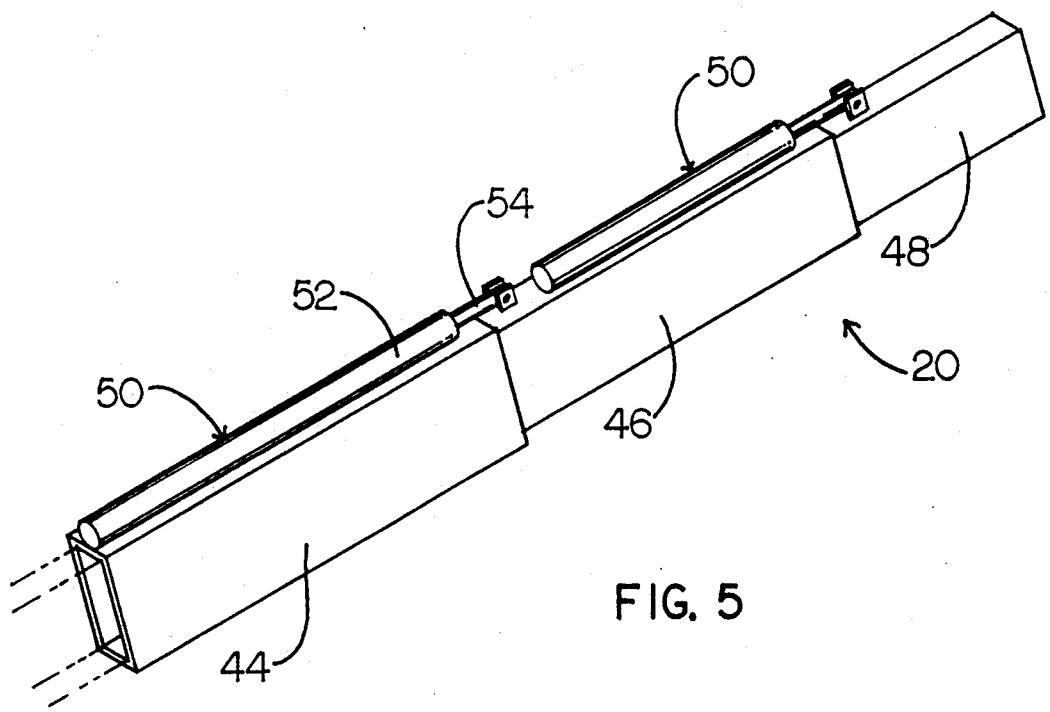
FIG. 5 is a perspective view of a single telescopic arm of the assembly of FIGS. 1 and 2.

FIGS. 5 and 6 depict two different embodiments of the arms 20 and the means for causing them to extend and retract compatible with the concept of the invention. In FIG. 5, a single telescopic arm 20 has lower, middle, and upper segments 44, 46, 48 respectively. Each of the hollow segments 44, 46, 48 has a size and shape allowing it to slidably mate with a portion of each adjacent segment. The uppermost segment 48 has the smallest circumference and nests within the middle segment 46, which in turn nests within the lower segment 44. The number and size of segments used to form each arm 20 is a function of the container depth and length, and the nesting of segments is adapted accordingly. Adjacent segments are connected by at least one externally mounted segment actuator 50. An outer cylinder or case 52 of the segment actuator 50 is attached to one segment and a piston or shaft 54 is attached an adjacent segment. As the piston 54 is activated in response to a control signal, the segments 44, 46, 48 move together and thereby collapse the arm 20, move apart and extend it, or are stabilized with respect to each other and thereby lock the arm 20 at a given length. Depending upon the control input, each of the segment actuators 50 may move the segments in unison or sequentially to extend or contract the arm 20 as desired.

Referring to FIG. 6, an alternative embodiment of a telescopic arm 20 is shown wherein a different embodiment of the segment actuators 50' are positioned inside the hollow arm 20 segments. In this embodiment a motor 56 attached to the interior of a segment turn a threaded shaft 58. The threads 60 of the threaded shaft 58 mate with a threaded block 62 located near the end of the adjacent segment. Rotation of the threaded shaft 58 causes the segments 44, 46, 48 to move together or apart depending upon the direction of rotation of the threaded shaft 58. When the threaded shaft 58 is not rotating, the segments 44, 46, 48 are locked into position. An optional safety stop 64 is provided at the end of each threaded shaft 58 to prevent an over-extension of the arm 20. The safety stop 64 impacts with the threaded block 62 of the nesting segment as it retracts a predetermined distance into the adjacent segment. Otherwise, operation of the arm 20 is substantially identical with the arm 20 of FIG. 5.

Numerous modifications and variations of the present invention are possible in light of the above teachings. It is, therefore, to be understood that within the scope of the appended claims, the present invention may be practiced otherwise than as in the embodiments specifically described hereinabove.

I claim:

1. A truck cover apparatus for drawing a flexible cover across an upper lip of an upwardly open container, comprising:
    a self-contained, compact cover assembly, including:
        a flexible cover having a first end and a second end;
        a cover support for said flexible cover, said cover support including a winding device attached to said first end of said flexible cover, said winding device facilitating smooth withdrawal and retraction of said cover;
        an assembly support member supporting said cover support, said assembly support member having a first and a second attachment point, said assembly support member and said first and said second attachment point being disposed directly below said cover support;
        a gantry supporting said cover support, said gantry including at least one support element, said at least one support element having a movement mechanism that raises and lowers said cover support with respect to said assembly support member in response to control inputs;
        a first and a second telescopic arm, said first telescopic arm pivotally attached at a first end to said first attachment point, and said second telescopic arm pivotally attached at a first end to said second attachment point, a second end of each said telescopic arm attached to said second end of said flexible cover, each said telescopic arm comprising at least one actuator for extending said telescopic arm in length when said telescopic arm pivots in a first direction and for contracting said telescopic arm in length when said telescopic arm pivots in a second direction, wherein extending said telescopic arms in unison withdraws said flexible cover from said winding device and contracting said telescopic arms in unison retracts said flexible cover into said winding device; and
        a drive mechanism pivotally moving said telescopic arms in said first direction and in said second direction.

2. The truck cover apparatus of claim 1, further comprising a tie-rod joining an upper end portion of said first telescopic arm to an upper end portion of said second telescopic arm, said tie-rod forming an attachment point along its length for said flexible cover.

3. The truck cover apparatus of claim 1, wherein said cover support is retracted below said upper lip of said upwardly open container when said gantry is fully retracted.

4. The truck cover apparatus of claim 1, wherein said second end of each said telescopic arm is retracted below said upper lip of said upwardly open container when said gantry is fully retracted.

5. The truck cover apparatus of claim 1, wherein said at least one support element of said gantry comprises left, center, and right telescopic supports, wherein said center telescopic support includes said movement mechanism.

6. The truck cover apparatus of claim 5, wherein said movement mechanism comprises an hydraulic piston.

7. The truck cover apparatus of claim 5, wherein said movement mechanism comprises a pneumatic piston.

8. The truck cover apparatus of claim 5, wherein said movement mechanism comprises a mechanical screw.

9. The truck cover apparatus of claim 5, wherein said movement mechanism comprises an electric motor.

10. The truck cover apparatus of claim 5, wherein said movement mechanism comprises a linear actuator.

11. The truck cover apparatus of claim 1, wherein said drive mechanism is coupled to said first and second telescopic arms.

12. The truck cover apparatus of claim 11, wherein said drive mechanism comprises an hydraulic piston.

13. The truck cover apparatus of claim 11, wherein said drive mechanism comprises a pneumatic piston.

14. The truck cover apparatus of claim 11, wherein said drive mechanism comprises a mechanical screw.

15. The truck cover apparatus of claim 11, wherein said drive mechanism comprises an electric motor.

16. The truck cover apparatus of claim 11, wherein said drive mechanism comprises a linear actuator.

17. The truck cover apparatus of claim 1, wherein said drive mechanism acts through a linkage to cause simultaneous fore and aft movement of said arms.

18. The truck cover apparatus of claim 1, wherein each said telescopic arm comprises a plurality of segments, each said segment nestable with at least one adjacent segment and connected thereto by an externally mounted actuator.

19. The truck cover apparatus of claim 1, wherein each said telescopic arm comprises a plurality of segments, each said segment nestable with at least one adjacent segment and connected thereto by an internally mounted actuator, said internally mounted actuator comprising an electric motor engaged with a threaded shaft.

20. The truck cover apparatus of claim 1, wherein said winding device comprises a spring loaded roller assembly.

21. A truck having a compact truck cover apparatus for drawing a flexible cover across an upper lip of an upwardly open container, comprising:

a truck cab;

a frame position behind said truck cab;

an upwardly open container having front, rear, first side, and second side container walls, said upwardly open container positioned on said frame behind said truck cab; and a self-contained, compact cover assembly, including:

a flexible cover having a first end and a second end;

a cover support protecting said flexible cover, said cover support including a spring loaded roller assembly attached to said first end of said flexible cover, said spring loaded roller assembly facilitating smooth withdrawal and retraction of said cover;

an assembly support member attached to said frame between said truck cab and said front container wall, said assembly support member supporting said cover support forward of said front container wall, said assembly support member having a first and a second attachment point, said assembly support member and said first and said second attachment point being disposed directly below said cover support;

a gantry supporting said cover support, said gantry having left, center, and right telescopic supports, said center telescopic support including a movement mechanism for raising and lowering said cover support with respect to said assembly support member in response to control inputs, said cover support is retractable below said upper lip of said upwardly open container when said gantry is fully retracted;

a first and a second telescopic arm, said first telescopic arm pivotally attached at a first end to said first attachment point, and said second telescopic arm pivotally attached at a first end to said second attachment point, a second end of each said telescopic arm attached to said second end of said flexible cover, each said telescopic arm comprising at least one actuator for extending and contracting said telescopic arms, said telescopic arms extending in length when said second end of each said telescopic arm pivots rearward from a position proximate said front container wall, and said telescopic arms contracting in length when said second end of each said telescopic arm pivots toward said front container wall, extension and contraction of said telescopic arms in unison causing said flexible cover to be conveyed across said upwardly open container adjacent said upper lip, and said second end of each said telescopic arm being retractable below said upper lip of said upwardly open container when said gantry is fully retracted;

a tie-rod joining an upper end portion of said first telescopic arm to an upper end portion of said second telescopic arm, said tie-rod forming an attachment point along its length for said flexible cover; and a drive mechanism pivotally moving said telescopic arms to move said tie-rod from one end of said upwardly open container to an opposite end thereof.

* * * * *